March 10, 1970     W. N. PHILLIPS     3,499,562

AIRLINE CATERING VEHICLE

Filed March 5, 1968     3 Sheets-Sheet 1

INVENTOR
WILLIAM N. PHILLIPS

BY
ATTORNEYS

March 10, 1970   W. N. PHILLIPS   3,499,562
AIRLINE CATERING VEHICLE

Filed March 5, 1968   3 Sheets-Sheet 2

INVENTOR
WILLIAM N. PHILLIPS

BY
ATTORNEYS

March 10, 1970  W. N. PHILLIPS  3,499,562
AIRLINE CATERING VEHICLE
Filed March 5, 1968  3 Sheets-Sheet 3

INVENTOR
WILLIAM N. PHILLIPS

BY
ATTORNEYS

United States Patent Office 3,499,562
Patented Mar. 10, 1970

3,499,562
AIRLINE CATERING VEHICLE
William N. Phillips, Auburndale, Fla., assignor to Leco, Inc., Lakeland, Fla.
Filed Mar. 5, 1968, Ser. No. 710,470
Int. Cl. B62d 39/00; B60p 1/02
U.S. Cl. 214—512                    2 Claims

ABSTRACT OF THE DISCLOSURE

A vehicle having a chassis with an operator's cab located at one side of the front portion thereof and a high-lift body which can be raised and lowered relative to said chassis and such body having a ramp located beside the cab and extending forwardly of the chassis.

BACKGROUND OF THE INVENTION

Field of the invention

The present invention relates generally to motor vehicles of various kinds and particularly to high-lift trucks which have a body that can be raised relative to the chassis so that the contents can be discharged at various elevations.

Description of the prior art

Heretofore, many high-lift trucks or vehicles have been provided in which the body could be raised relative to the chassis and utilized for various reasons. The contents of most of these high-lift vehicles have been discharged either by tilting the body to the side or the rear. In some instances the vehicle has been maneuvered to an elevated dock and the contents have been discharged through the rear of the body. Some efforts have been made to discharge the contents from the front of a high-lift body by providing a separate ramp over the top of the cab which was engaged by the body when such body was raised to raise the ramp.

These prior devices have not been satisfactory particularly when the contents were to be discharged into an airplane. The loading and unloading of an airplane has presented special problems not encountered in any other field. As an example, the airplane is located at a substantial elevation above the ground in the area where most of the loading and unloading must be accomplished and there is no structure beneath the same. Also the airplane must necessarily be constructed of relatively thin lightweight metal which is easily dented if struck by a heavy object, such as the body of a high-lift vehicle. At the same time the vehicle must be positioned close to the airplane to facilitate loading and unloading. Therefore, it is necessary that the operator of the high-lift vehicle be afforded maximum visibility so that he can maneuver the vehicle to a position in close proximity to the airplane without causing damage thereto.

SUMMARY OF THE INVENTION

The present invention is a catering vehicle for use in the loading and unloading of an airplane and includes a chassis with an operator's cab or station located at the front and one side thereof, and such vehicle has a body which can be raised or lowered in any desired manner. As shown the body is mounted on the chassis by a pivoted X-frame and is raised and lowered by fluid cylinders to a desired elevation. The body is provided with a fixed integral ramp or platform extending forwardly beside the operator's cab and terminates in a position forwardly of the chassis. The operator's cab is provided with windows at the front, rear, and both sides, as well as the top to afford maximum visibility for the operator. If desired the front of the platform or ramp may have a cushioning member such as a rubber bumper which may or may not be connected to the controls which operate the body and the vehicle.

It is an object of the invention to provide a catering vehicle for an airplane which has a high-lift body that can be raised and lowered to any desired elevation and such body has an integral platform extending forwardly beyond the front of the vehicle chassis.

Another object of the invention is to provide a catering vehicle for an airplane in which the operator's cab is mounted on the chassis of the vehicle at the front and one side thereof and such cab is provided with windows which permit maximum visibility in all directions.

A further object of the invention is to provide a catering vehicle for an airplane having a high-lift body with an integral ramp extending forwardly of the chassis of the vehicle and with a cushioning member or bumper mounted on the forward end of the ramp and provided with means for controlling the position of the high-lift body.

DESCRIPTION OF THE PREFERRED EMBODIMENT

Figure 1:
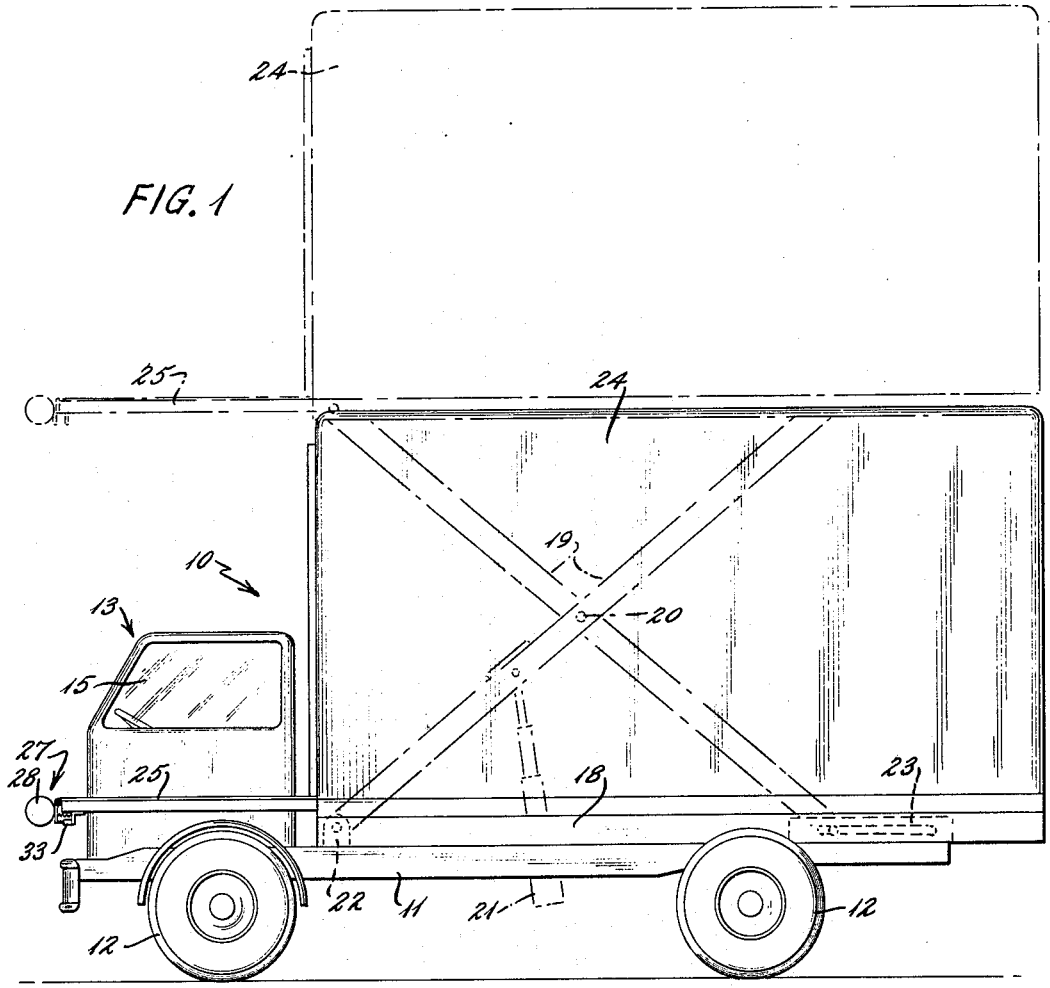
FIG. 1 is a side elevation of the catering vehicle of the present invention.
Figure 2:
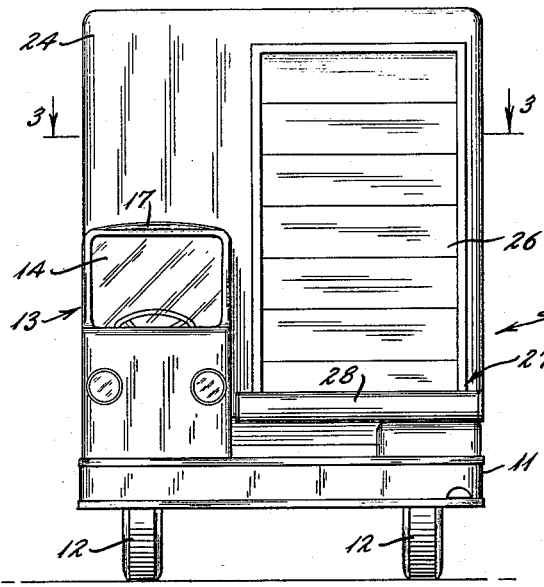
FIG. 2 is a front elevation thereof.
Figure 3:
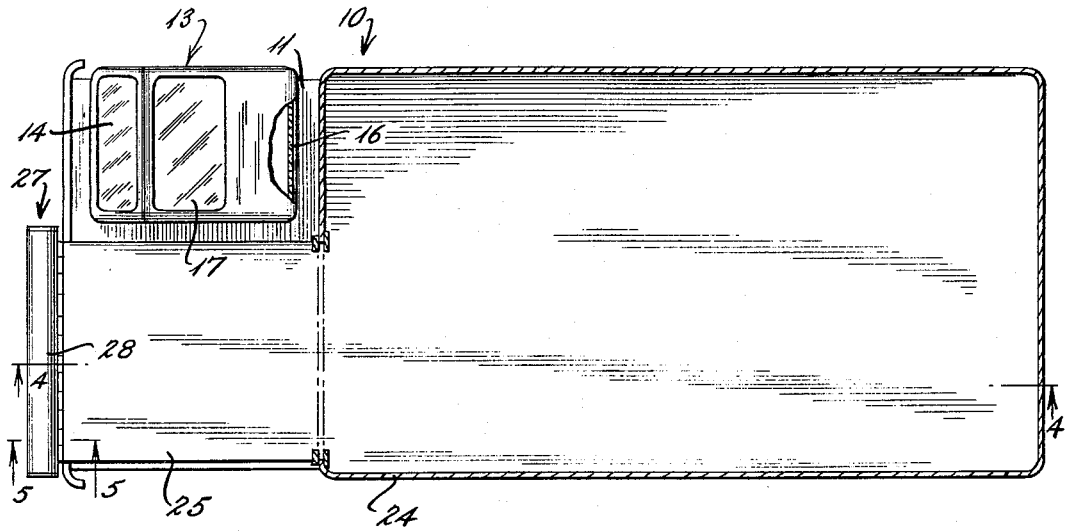
FIG. 3 is a section on the line 3—3 of FIG. 2.
Figure 4:
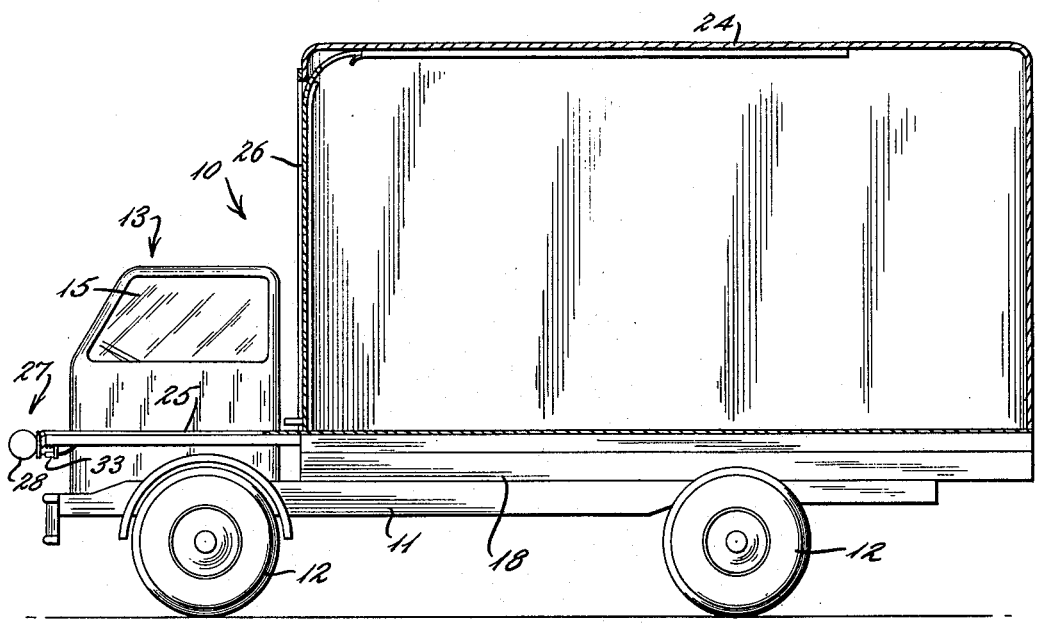
FIG. 4 is a section on the line 4—4 of FIG. 3 showing the door in closed position.
Figure 5:
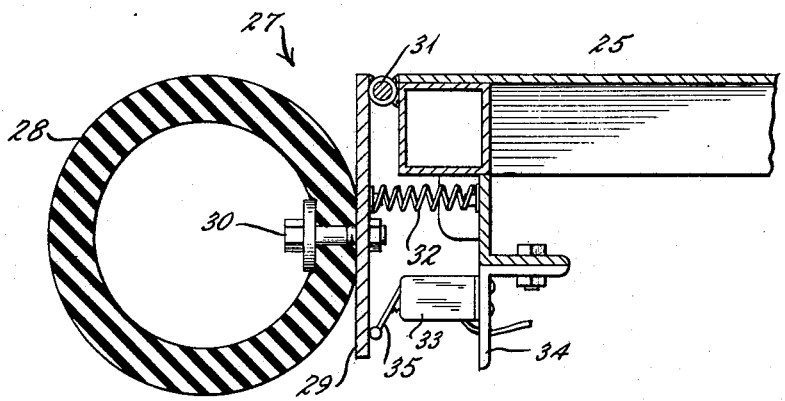
FIG. 5 is an enlarged detailed section on the line 5—5 of FIG. 3.

With continued reference to the drawings, a vehicle 10 is provided having a chassis 11 mounted on ground-engaging wheels 12 and provided with any conventional power plant (not shown). An operator's cab 13 is mounted at the front and at one side of the cassis 11 and such cab is provided with a windshield 14, side windows 15 which can be raised and lowered, as well as a read window 16 and a top window 17 which normally are fixed but could be movable if so desired. As illustrated the operator's cab 13 is mounted on the righthand side of the chassis; however, this could be mounted on the lefthand side by a mere reversal of parts. The windshield 14, side windows 15 and top window 17 permit maximum visibility ahead, at both sides, and above the operator at all times, while the rear window 16 permits visibility to the rear when the body of the vehicle is raised.

A frame 18 is mounted on the chassis 11 and such frame is adapted to be raised and lowered in any desired manner, as for instance by cross arms 19 pivoted together by a pin 20 and adapted to be raised and lowered by one or more fluid cylinders 21. One of the cross arms 19 at each side of the vehicle is pivotally mounted on a lug 22 mounted on the chassis 11 while the other arm is slidably received within a slot 23.

A body or housing 24 having a floor is mounted on the frame 18 and such body has a platform or ramp 25 integrally fixed thereto and forming a part thereof which extends forwardly beside the cab 13 and terminates in a position forwardly of the chassis 11. As illustrated, the body 24 is provided with a front door 26 which may be of the overhead sliding type, although it is contemplated that a sideways sliding door or one or more hinged doors could be used. Also if desired a rear door (not shown) may be provided for loading the vehicle from a fixed loading dock or platform.

At the front of the platform or ramp 25 a cushion member or bumper 27 is provided which includes an elongated cylindrical member 28 constructed of rubber or other shock absorbing material, and such cylindrical member is mounted on a backup plate 29 in any desired manner, as by fasteners 30. The plate 29 is connected by a hinge 31 to the front of the platform 25 with such hinge being located adjacent to one edge of the plate so that the plate will remain in substantially a perpendicular position by gravity. A spring 32 is disposed between the plate 29 and the end of the platform 25 to counter the weight of the cylindrical member 28 and to maintain the plate 29 in a substantially vertical position. A micro-switch 33 mounted on a bracket 34 is carried by the platform 25 and such micro-switch has an operating arm 35 disposed in a position to be engaged by the backup plate 29.

Figure 6:
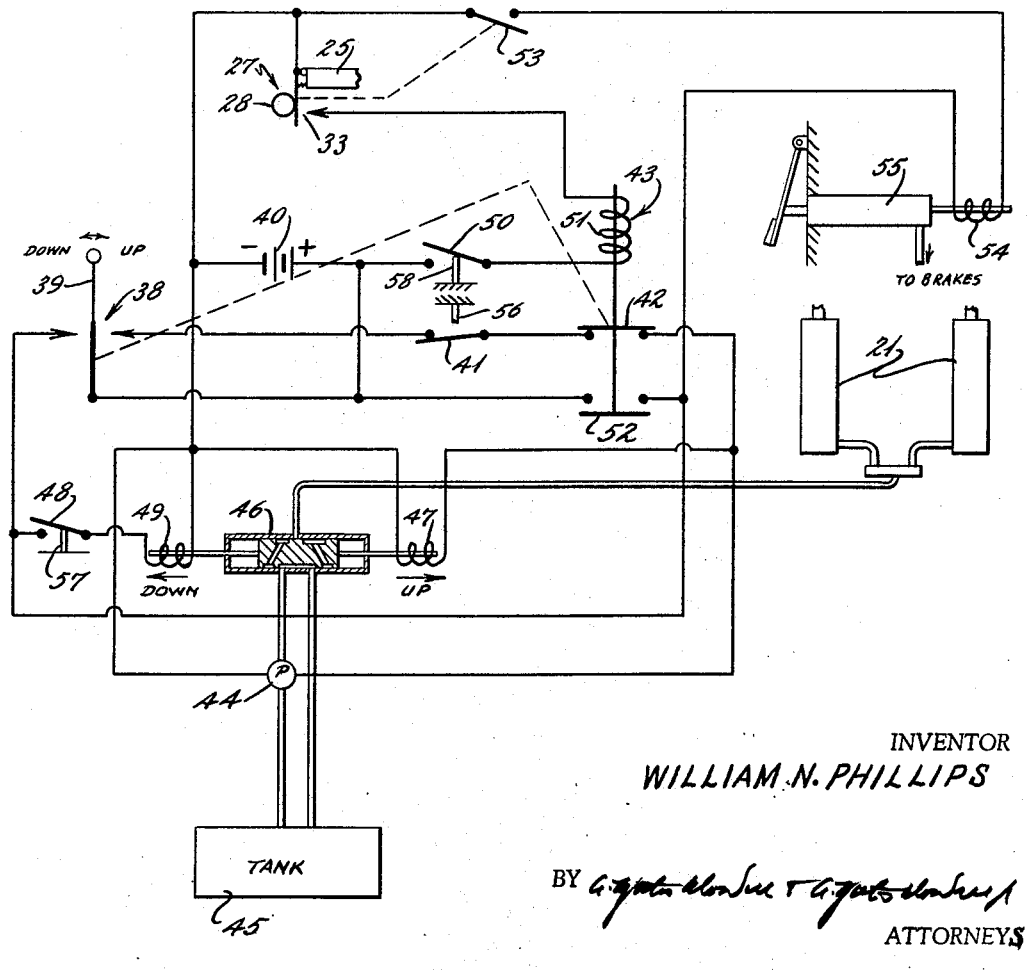
FIG. 6 is an electrical and fluid schematic of the control system of the vehicle.

With reference to FIG. 6 a control mechanism 38 is provided which includes an operating lever 39 located within the cab 13 for ready access by the operator of the vehicle. When the operating lever 39 is moved to the Up position electrical energy will flow from a battery 40 through a normally closed limit switch 41 and through a normally closed terminal 42 of an overriding switch 43 to a pump 44 which pumps fluid under pressure from a reservoir 45 into a distributor valve 46 when operated. Simultaneously electrical energy will flow through a solenoid 47 which will cause the piston of the distributor valve 46 to move to the right in FIG. 6, and permit fluid to flow into the fluid cylinders 21 to raise the frame 18 and the body 24. As soon as the frame has reached the desired elevation, the operating lever 39 is returned to a neutral position breaking the flow of electrical energy which stops operation of the pump 44 and returning the self-centering piston of the distributor valve 46 to a neutral position.

When it is desired to lower the body 24 the operating lever 39 is moved to the Down position so that electrical energy will flow through a normally closed limit switch 48 to a solenoid 49 which moves the piston of the distributor valve 46 to the left in FIG. 6 to permit fluid from the cylinders 21 to flow back into the reservoir.

When the body 24 is in raised position, the operator of the vehicle approaches slowly until the cylindrical member 28 is located adjacent to the airplane. If the member 28 engages the side of the plane and forces the plate 29 toward the platform 25 against the tension of the spring 32, this movement of the backup plate 29 will close the micro-switch 33 and permit fluid energy to flow through a normally closed limit switch 50 to a solenoid 51 which controls the position of the overriding switch 43 and causes such switch to open the terminals 42 and close a terminal 52. The micro-switch 33 is linked to a normally open line switch 53 so that when the micro-switch is closed the line switch 53 likewise will be closed.

The closing of the terminal 52 and the line switch 53 will permit electrical energy to flow to a solenoid 54 which is associated with the master cylinder 55 of the hydraulic brake system of the vehicle to cause the wheel brakes to be applied. Simultaneously electrical energy will be applied to the Down solenoid 49 to move the piston of the distributor valve 46 to the left in FIG. 6 and automatically lower the body 24. This condition will exist until the cylindrical member 28 is moved away from the airplane so that the spring 32 can return the plate 29 to its initial position and thereby open the micro-switch 33 and the line switch 53. It is noted that the overriding switch 43 is linked to the operating lever 39 so that when the solenoid 54 is operated to move the overriding switch the operating lever 39 will be returned to a neutral position.

The limit switch 41 normally is closed until the frame 18 has reached its uppermost limit whereupon such limit switch will engage a pin 56 to open the switch 41 and stop continued upward movement of the frame. The limit switches 48 and 50 normally are closed as long as the frame 18 is raised from the chassis 11, but when the frame is lowered, pins 57 and 58 will open the switches 48 and 50 respectively. The opening of the switches will prevent downward movement of the frame but will permit operation of the brakes by the operator.

In the operation of the device the body of the truck can be loaded at a supply dock or platform and thereafter the vehicle is driven to a waiting airplane and generally aligned with the cargo door thereof. As the vehicle approaches the plane, the body 24 with the forwardly extending ramp 25 is raised to approximately the elevation of the cargo door and the vehicle is slowly driven forward while the operator watches through the top window 17 until the bumper 27 is in close proximity to the plane. Thereafter the front door 24 is opened and the cargo is transferred to the plane. Should the operator of the vehicle fail to stop such vehicle before the bumper 27 engages the plane, such bumper will close the micro-switch 33 and the line switch 53 and automatically apply the brakes of the vehicle and lower the body until the bumper is no longer in engagement with the plane.

It will be obvious to one skilled in the art that various changes may be made in the described embodiment of the invention without departing from the spirit and scope thereof and therefore the invention is not limited by that which is illustrated in the drawings and described in the specification, but only as indicated in the accompanying claims.

What is claimed is:

1. An airplane catering vehicle comprising a chassis mounted on ground-engaging wheels having brakes, an operator's cab mounted at the front end at one side of center of said chassis, said cab having front, rear, top and side windows to provide full view ahead, above and to both sides at all times and rearwardly when the body of the vehicle is raised, a body including a frame mounted for elevational movement on said chassis, means for raising and lowering said frame in a generally vertical direction, a portion of said frame located at the other side of center of said chassis and extending forwardly of said cab and beyond the front of said chassis, a floor fixed to the upper surface of said frame, a housing carried by said frame rearwardly of said cab, said housing having a door located generally in alignment with said portion of said frame to provide access to said housing therefrom, resilient bumper means mounted on the front end of said frame portion and projecting forwardly beyond the same, sensing means operatively associated with said bumper means and electrically connected to solenoid means carried by said brakes, whereby said platform can be moved adjacent to an opening in an airplane to permit ready transfer of the material from within said housing to said plane, and contact between the airplane and said bumper means will energize said brakes to stop the vehicle.

2. The structure of claim 1 including sensing means operatively associated with said bumper means for lowering said frame automatically when said frame is in raised position.

References Cited

UNITED STATES PATENTS

| | | | |
|---|---|---|---|
| 2,797,833 | 7/1957 | Cash | 214—512 |
| 2,929,655 | 3/1960 | Hurter | |
| 3,090,514 | 5/1963 | Black et. al. | 214—512 |

FOREIGN PATENTS

| | | |
|---|---|---|
| 1,100,906 | 3/1961 | Germany. |

ALBERT J. MAKAY, Primary Examiner

U.S. Cl. X.R.

180—89